Feb. 19, 1935.  H. A. COURMETTES  1,991,544
BIFOCAL LENS
Filed Sept. 22, 1933
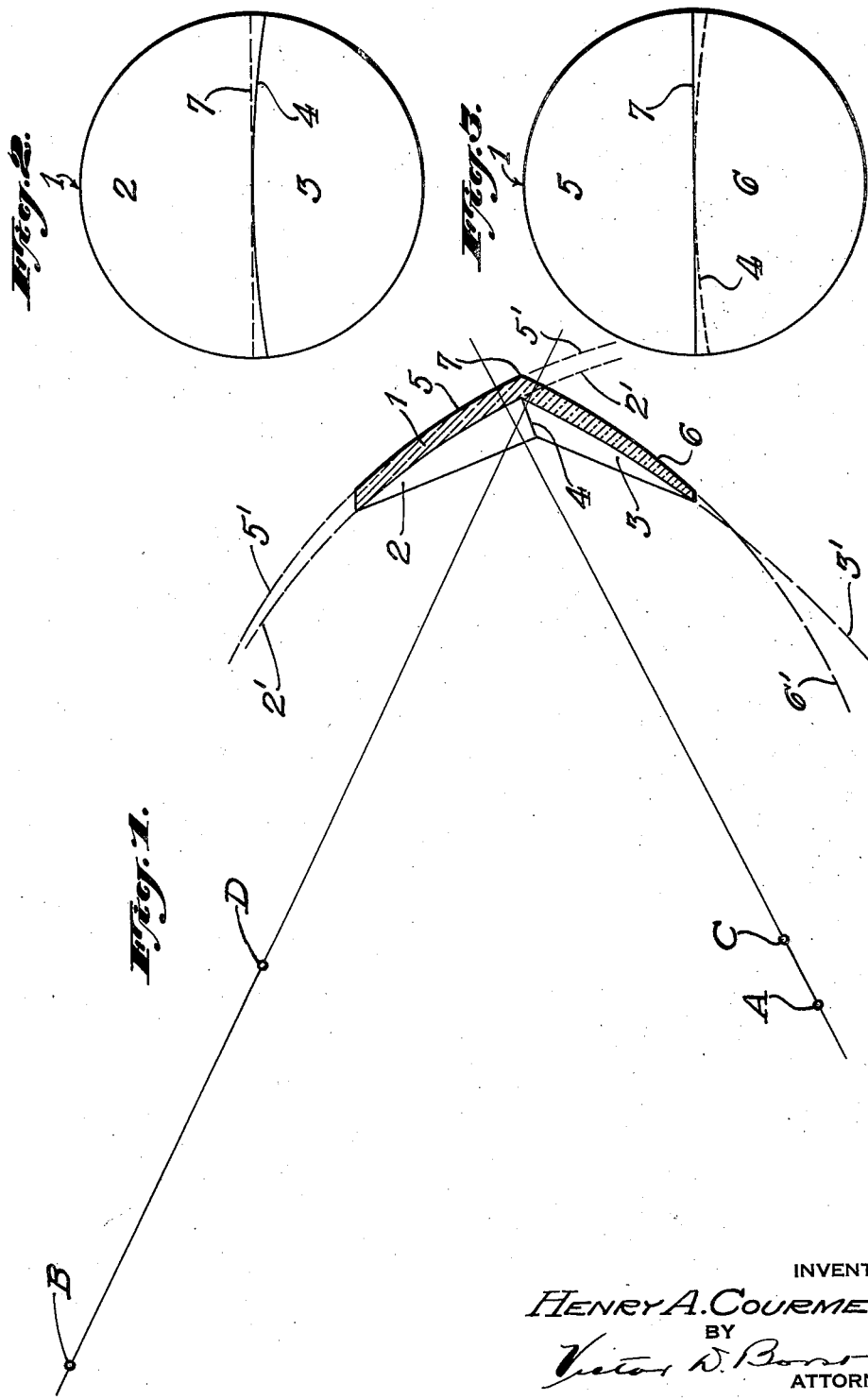
INVENTOR
Henry A. Courmettes.
BY
ATTORNEY Patented Feb. 19, 1935

1,991,544

UNITED STATES PATENT OFFICE 1,991,544

BIFOCAL LENS

Henry A. Courmettes, Brooklyn, N. Y.

Application September 22, 1933, Serial No. 690,541

5 Claims. (Cl. 88—54)

This is a continuation of that part of my application for Letters Patent Serial Number 593,-301, filed February 16, 1932, which relates to a construction of bifocal lenses. Specifically this invention relates to one piece bifocal lenses in which the optical surfaces are formed on one homogeneous piece of glass, as distinguished from composite lenses formed by fusing together two pieces of glass of different indices of refraction.

The principal purpose of the invention is the control of the optical axis of the near vision or reading field of the lens while avoiding a shoulder or step in the surface of the glass and at the same time maintaining a downward curve for the division line between the two fields.

The original one piece bifocal was known as the solid bifocal and was made by first forming a lens of the stronger power desired for the reading field, and then grinding off the upper portion of the convex side to a weaker curve for the distance field. This of course gave an upward curve to the dividing line between the two fields which for well known reasons was objectionable.

The first attempt to provide a lens with the dividing line curved downwardly was somewhat the reverse of the solid bifocal in that the lens was first finished to the power desired for the distance vision and then on the convex side a stronger lenticular surface was formed in the lower or reading portion. This manifestly necessitated a shoulder in the glass about the reading field although the shoulder had the merit of being downwardly curved.

Next in sequence was the present commercial one piece bifocal in which the reading field is formed by making the inner or concave face of the glass of a meniscus or toric lens of two dioptric powers, the reading area being of weaker curvature or of longer radius than the distance area. In other words there is less minus power for the reading than for the distance field. The grinding tool for grinding the inner face of the lens blank is flattened off to form the reading field portion. This of course results in a downward curve for the dividing line between the two fields. At the same time it throws the optical center of the reading field well down from the dividing line, the distance of which depends upon the added power of the reading field.

By my invention one is enabled to preserve the downward curve of the dividing line and the absence of a shoulder characteristic of this last mentioned one piece bifocal and at the same time readily control the optical axis of the reading field, bringing it up to the division between the two fields or as near thereto as may be desired. Thus the lens may be made monocentric or the two centers may be brought close together though not in actual coincidence, and the jump which is otherwise observable as the eye passes from one field to the other be avoided.

In accordance with my invention the lens is treated so as to modify the prismatic effect of the reading field without altering its lenticular power. To do this I displace the center of generation of the convex surface of the reading area from that of the distance area so as to provide in effect an angular relation between the two areas. This displacement is in such direction as to make the bottom edge of the reading field thinner than it would otherwise be and throw the base of the prism up. This of course may be carried to the extent of throwing the base of the prism to the top edge of the reading field.

The intersection of two intersecting spheres is a circle in the plane of intersection. Viewed edge on the circle of course appears as a straight line, and for the purpose of consideration and illustration of my invention, I am taking as the reference of observation plane the plane of intersection between the two spheres of which the two angularly disposed outer or convex surfaces form parts, when the two spheres have equal radii. In other words I am considering the lens as it appears projected on a plane normal to the said reference plane. Obviously under the condition mentioned, that is, when the two outer spherical surfaces are of equal spherical radii, the line of joinder between them and which constitutes a portion of the circle defining the intersection of the two spheres, will appear as a straight line since the projection is on a plane normal to the plane of intersection. In other words the plane of intersection is viewed edge on.

My invention involves no restriction on the relation of the radii of the two outer spherical surfaces. If, instead of the spherical radii being equal, the spherical radius of the lower or reading area be the longer, then the aforesaid projection will show the dividing line as a downwardly curved portion of an ellipse. And, conversely, if the spherical radius of the upper convex area be the longer, the aforesaid projection will show the dividing line as an upwardly curved portion of an ellipse.

In order that this line formed by the angle on the outer face may be inconspicuous, the dividing line on the inner face will be made to conform to it as near as practicable. This will ordinarily require that the curve of the dividing line on the inner face be of considerable radius. If, for example, the line on the outer face marking the angle be a straight line or nearly so as projected on a plane normal to said reference plane, then the curve of the line on the inner face similarly projected should approximate a straight line. The greater the radius of this curve the greater of course will be the angle between the distance and reading areas of the inner face. Consequently, ordinarily the lens will have an appreciable angle between the planes of the two fields.

In the drawing I have shown one embodiment of my invention but it will be understood that this is merely illustrative and that the design will be widely varied according to conditions.

Fig. 1 is a section of a lens with constructional lines for aiding the understanding of the generation of the lens.

Fig. 2 is an inner face view of the lens.

Fig 3 is an outer face view of the lens.

The lens illustrated is of the meniscus or toric type, the inner or concave face of which is spherical and is composed as usual of a distant vision area 2 and a near vision or reading area 3 of lesser curvature. From the standpoint of the reference plane before mentioned, the dividing line 4 between the two areas is necessarily curved downwardly since the lower area is the weaker, and the two areas meet evenly as shown, that is, without a step or shoulder in the surface. The center of curvature of the surface area 2 is indicated at A, and the center of curvature of the surface area 3 is indicated at B.

The outer face of the lens is also composed of two angularly disposed surface areas 5 and 6 meeting evenly at the line 7. The center of curvature of the area 5 is indicated at C, and the center of curvature of the area 6 is indicated at D. The optical axis of the reading field is therefore the line B—D, and the optical axis of the distant vision field is the line A—C. It will be clear that the point D may be located as desired, and that its location determines the optical axis of the reading field. It will usually be located so as to bring the optical axis of the reading field a few millimeters below that of the distance field, as shown, although other relationship, such as monocentricity may be obtained if desired.

It will readily be appreciated by those skilled in the art that the concurrence of the lines 4 and 7 is sufficiently approximate to avoid any confusion of vision to the wearer and also to make them appear as one line to an observer. The dioptric power of the surface 3 will of course be adjusted with respect to that of the surface 6 to give the desired addition. Ordinarily the curvature of the surface 6 will not depart substantially from that of the surface 5 and therefore the line 7 will not depart much from a straight line in the aspect herein considered.

As a consequence the surface 3 must be at a decided angle to the surface 2 in order to make the line 4 of sufficient radius to approximate the line 7.

The continuations of the surfaces 2 and 5 are indicated by the dotted lines 2'—2' and 5'—5', respectively. Similarly the continuations of the surfaces 3 and 6 are indicated by the dotted lines 3' and 6' respectively. It will readily be seen that except for the displacement of the center D from the center C, the optical axis of the reading field would be the line B—D.

The incidental advantage resultant from my invention is the fact that the planes of the two fields of the lens are at an obtuse angle to each other, substantially normal to the lines of vision. The real advantage, however, is the fact that without a shoulder in either face of the lens, the objections to which are well known, I am able to bring the optical centers of the two fields together or as nearly so as may be desired and at the same time maintain the desired downward curve of the dividing line between the two fields.

While I have shown a plus power lens, it will be understood that the invention is equally applicable to negative lenses. It will also be understood that while I have described the outer face as finished to spherical surfaces, those surfaces may assume any form required by the prescription.

I claim:

1. A meniscus one piece bifocal lens the inner face of which has a lower near vision surface area of relatively weak curvature meeting an upper distant vision surface area evenly without a shoulder throughout the line of joinder, and the outer face of which has near vision and distant vision surface areas of substantially the same curvature opposing and substantially coextensive with the corresponding inner surface areas, the centers of generation of the two outer surface areas being separated.

2. A meniscus one piece bifocal lens the inner face of which has a lower near vision surface area of relatively weak curvature meeting an upper distant vision surface area evenly without a shoulder throughout the line of joinder, and the outer face of which has near vision and distant vision surface areas of substantially the same curvature opposing and substantially coextensive with the corresponding inner surface areas, the centers of generation of the two outer surface areas being separated so as to throw the optical axis of the near vision field up.

3. A meniscus one piece bifocal lens the inner face of which has a lower near vision surface area of relatively weak curvature meeting an upper distant vision surface area evenly without a shoulder throughout the line of joinder, and the outer face of which has near vision and distant vision surface areas of substantially the same curvature opposing and substantially coextensive with the corresponding inner surface areas, the centers of generation of the two outer surface areas being separated and the dividing lines between the two fields on the inner and outer faces being substantially opposite.

4. A one piece bifocal lens composed of a single homogeneous piece of glass the inner face of which is concave and comprises an upper distant vision area and a lower near vision area meeting evenly throughout in a downwardly curved line, and the outer face of which has two angularly disposed corresponding surface areas meeting evenly in a line substantially opposing that on the inner face.

5. A one piece bifocal lens composed of a single homogeneous piece of glass the inner face of which is concave and comprises an upper distant vision area and a lower near vision area meeting evenly throughout in a downwardly curved line, and the outer face of which has two corresponding surface areas meeting evenly in a line substantially opposing that on the inner face, the outer surface areas being so angularly disposed as to affect the desired relation between the optical centers of the two fields.

HENRY A. COURMETTES.